United States Patent [19]
Kishi

[11] 4,022,395
[45] May 10, 1977

[54] TAPE CASSETTE

[75] Inventor: Yoshio Kishi, Tokyo, Japan

[73] Assignee: Sony Corporation, Tokyo, Japan

[22] Filed: Dec. 2, 1975

[21] Appl. No.: 636,829

[30] Foreign Application Priority Data

Dec. 3, 1974 Japan .......................... 49-138985

[52] U.S. Cl. ............................................ 242/198
[51] Int. Cl.² .................... G03B 1/04; G11B 15/32; G11B 23/04
[58] Field of Search ...................... 242/197–200; 360/93, 96, 132; 352/72, 78 R

[56] References Cited
UNITED STATES PATENTS

| 3,653,608 | 4/1972 | Dickens et al. | 242/199 |
| 3,848,265 | 11/1974 | Biery et al. | 360/132 |
| 3,924,823 | 12/1975 | Cohen et al. | 242/198 |

*Primary Examiner*—Leonard D. Christian
*Attorney, Agent, or Firm*—Lewis H. Eslinger; Alvin Sinderbrand

[57] ABSTRACT

A tape cassette having a housing of generally rectangular configuration and containing a supply of tape wound on reels with a run of the tape being guided along a side of the housing at which the latter is open; is provided with cutouts in the top and bottom walls of the housing extending to the open side of the latter and through which tape withdrawing members may be inserted in the housing in back of the tape run for withdrawing the tape from the housing upon movement of the tape withdrawing members out of the cutouts through the open side of the housing, and lid members pivotally mounted on the housing adjacent respective corners of the latter which are at opposite ends of the open side for swinging movements relative to the housing in directions parallel to the top and bottom walls between a closed position in which the lid members extend along respective parts of the open side of the housing for covering at least parts of the tape in the adjacent run and an opened position in which the lid members are displaced from such open side, for example, by the movement of the tape withdrawing members therethrough.

19 Claims, 13 Drawing Figures

TAPE CASSETTE

BACKGROUND OF THE INVENTION

1. Field of the Invention

This invention relates generally to tape cassettes, and more particularly is directed to improvements in magnetic tape cassettes of the type in which the magnetic tape may be withdrawn from the cassette housing for recording and reproducing information signals on the tape.

2. Description of the Prior Art

The conventional tape cassette is provided with a plurality of openings at the front side of the cassette housing through which a magnetic recording and/or reproducing head, a pinch roller, capstan and the like may be inserted into the cassette housing to record and/or reproduce signals on the tape while the latter is driven or transported in a predetermined direction. However, in such a tape cassette, the number and size of the openings that may be formed in the cassette housing are limited and this, in turn, limits the number and size of the magnetic heads that may be employed for recording and reproducing operations. Accordingly, in existing magnetic tape recording and reproducing apparatus intended for use with tape cassettes of the described type, that is, in which the tape remains wholly within the cassette housing during recording and reproducing operations, the same magnetic head which is used for reproducing signals recorded on the tape is also used, in association with an erasing head, for recording new signals on the tape. It is known that the use of the same magnetic head for both recording and reproducing operations limits the quality of the audio or other information signals that may be recorded and reproduced thereby. Further, when the magnetic recording and/or reproducing head is inserted into the cassette housing for engagement with the tape therein, as aforesaid, it is difficult to ensure the precise positioning of the tape relative to such head, and variations of the position or path of the tape relative to the recording and/or reproducing head also deleteriously affects the quality of the recorded and reproduced signals.

Therefore, when it is desired to obtain high quality recording and reproducing of audio or other information signals, it has been the usual practice to employ apparatus of the open-reel type having separate or individual heads for respectively recording and reproducing signals on the tape which is precisely guided relative to such heads in the run of the tape between the supply and take-up reels. However, apparatus of the open-reel type has the well known disadvantages of requiring the manual threading of the leader or end portion of the tape from the supply reel past the guide pins and heads, and between each capstan and associated pinch roller to the take-up reel when installing a tape on the apparatus, and of requiring rewinding of the entire tape onto the supply reel when one tape is to be exchanged for another.

In order to avoid the above described disadvantages of recording and reproducing apparatus of the open-reel type and the limitations on the quality of recording and reproduction previously attainable with cassette-type recording and reproducing apparatus, it has been proposed, for example, as disclosed in United Kingdom Patent Specification No. 1,121,125, published July 24, 1968, to provide a cassette from which the tape is withdrawn when signals are to be recorded or reproduced thereon by means of respective magnetic heads which are disposed outside of the cassette housing. In the apparatus as disclosed in the foregoing patent, tape guides mounted on swingable arms and a pinch roller are initially inserted into the cassette housing and then displaced relative to the latter for withdrawing the tape from the cassette housing and into engagement with the magnetic heads and capstan. However, in cassettes intended for use with such apparatus, the tape is exposed at the exterior of the cassette housing even when the cassette is not in use, so that the exposed tape is susceptible to being damaged or even severed and will collect dust thereon.

The exposure of the tape when the cassette is not in use may be avoided by the cassette arrangement disclosed in U.S. Pat. No. 3,900,171, issued Aug. 19, 1975, and having a common assignee herewith. In such cassette, the housing has an opening extending along one of its sides and is provided with a lid which is normally spring-biased and locked to cover the tape extending across such opening of the cassette housing when the cassette is not in use and thereby protects the tape from damage thereto. However, in this previously proposed tape cassette, the lid is arranged to open in the upward direction, so that, when the cassette is disposed in its operative position, a specific lid opening means is required in addition to a tape withdrawing means. Thus, the described tape cassette is disadvantageous in that it limits the design and leads to complexity in the construction of the tape loading device, which is to be provided for withdrawing the tape from the cassette.

OBJECTS AND SUMMARY OF THE INVENTION

Accordingly, it is an object of the invention to provide a tape cassette which avoids the above-mentioned disadvantages of the existing or previously proposed tape cassettes.

More specifically, it is an object of this invention to provide an improved tape cassette from which the tape may be withdrawn for the recording and/or reproducing of signals thereon, and which has an improved lid arrangement which facilitates the withdrawal of the tape and substantially protects the tape in the cassette when the latter is not in use.

In accordance with an aspect of this invention, a tape cassette comprises a housing of generally rectangular configuration having substantially parallel top and bottom walls and a peripheral wall extending between the top and bottom walls along three of the sides of the housing so as to define an opening between the top and bottom walls along the fourth side of the housing; reel means rotatably disposed in said housing and having a supply of tape wound thereon; guide means in said housing for guiding said tape in a run extending along the fourth side of the housing; the top and bottom walls having at least a pair of cutouts therein which communicate with said opening and through which tape withdrawing means may be inserted in said housing in back of the tape run for withdrawing the tape from the housing through such opening in response to movement of the tape withdrawing means out of said cutouts through said opening; and lid means mounted on said housing for movement in directions parallel to the planes of said top and bottom walls between a closed position, in which said lid means extend along at least part of said fourth side of the housing for covering at least a respective part of the tape in said run, and an opened position, in which said lid means are displaced from said opening for permitting the withdrawal of the tape therethrough.

In preferred embodiments of the invention, the lid means include a pair of lid members mounted to pivot relative to the housing about respective pivoting axes disposed adjacent the corners of the housing which are at the opposite ends of the open side thereof for swinging movement of the lid members between their closed and opened positions. Further, the lid members may be advantageously dimensioned to extend across the cutouts in the top and bottom walls when the lid members are in the closed position so as to be displaced to the opened position in response to the movement of the tape withdrawing means out of the cutouts through the opening of the housing. Alternatively, each of the lid members may include opposite end portions extending laterally inward and laterally outward, respectively, relative to the respective pivoting axis in the closed position of the lid member, and the laterally outward extending end portion of each of the lid members has a notch formed therein by which the lid member may be engaged for displacement to its opened position.

The above, and other objects, features and advantages of this invention, will be apparent in the following detailed description of an illustrative embodiment which is to be read in connection with the accompanying drawings.

DESCRIPTION OF A PREFERRED EMBODIMENT

Figure 1:
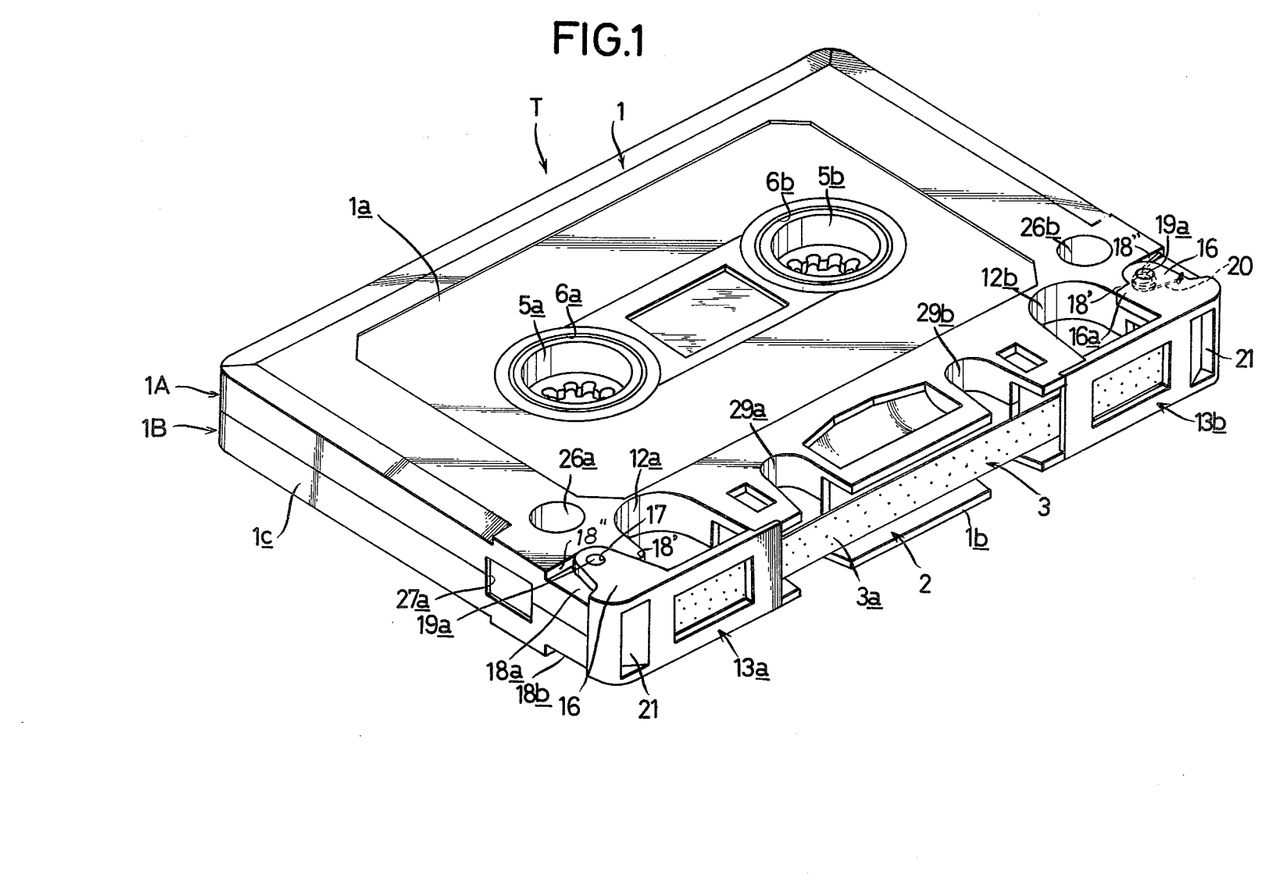
FIG. 1 is a perspective view of a tape cassette in accordance with one embodiment of this invention, and which is shown with its lids closed.
Figure 2:
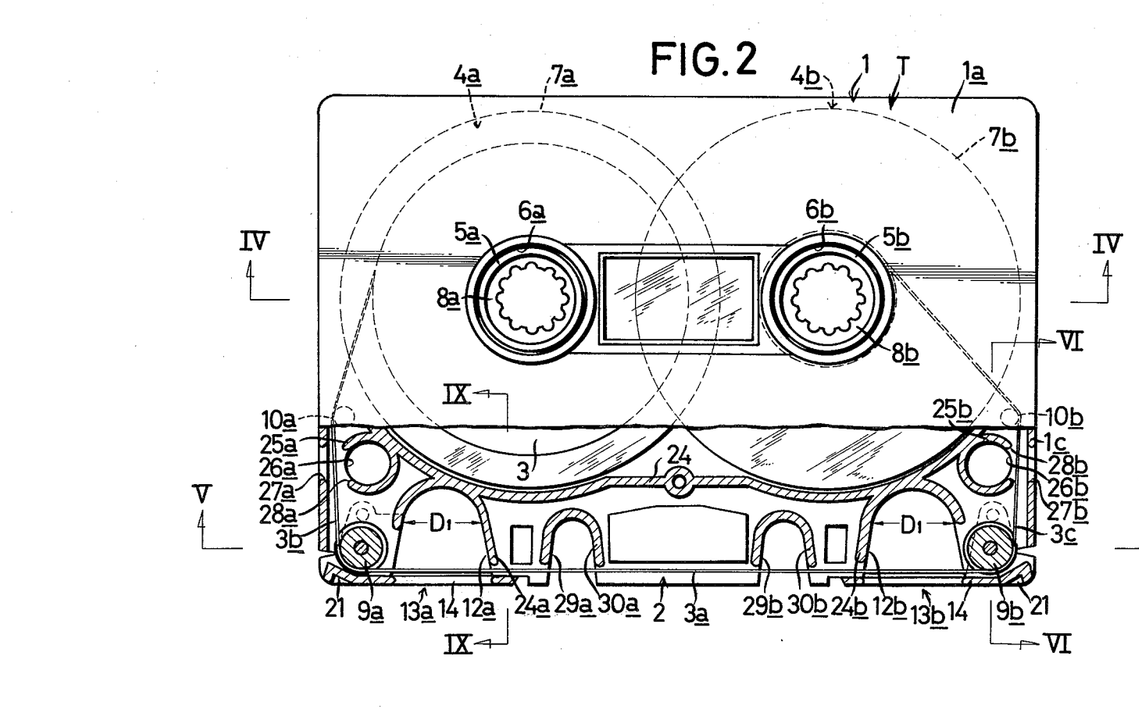
FIG. 2 is a top plan view of the tape cassette which is shown with its top wall partly broken away.

Referring to the drawings in detail, and initially to FIGS. 1 and 2 thereof, it will be seen that a tape cassette T according to an embodiment of this invention generally comprises a substantially rectangular cassette housing 1 formed of mating, molded plastic upper and lower sections 1A and 1B which are suitably secured together, and which are respectively constituted by top and bottom walls 1a and 1b having peripheral flanges extending along one of the relatively long sides and both of the relatively short sides of the rectangular housing 1 for defining a peripheral wall 1c. It will be apparent that the peripheral wall 1c extends along only three of the sides of rectangular housing 1 so that an opening 2 is defined between top and bottom walls 1a and 1b along the fourth relatively long side of the housing.

Figure 4:
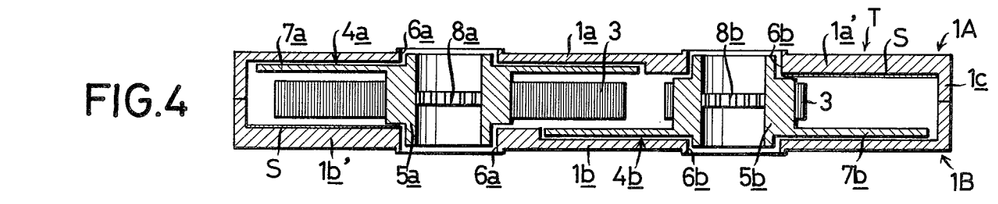
FIG. 4 is a sectional view taken along the line IV—IV on FIG. 2.

As shown particularly on FIGS. 2 and 4, a supply of tape 3 is contained in housing 1 and is wound on supply and take-up reels 4a and 4b. As shown, supply reel 4a may include a cylindrical hub 5a which, at its upper and lower ends, is loosely and rotatably guided in circular holes 6a provided in the top and bottom walls of housing 1. An upper flange 7a extends radially outward from hub 5a under the top wall 1a of housing 1. The inner surface of hub 5a is formed with a plurality of circumferentially spaced apart, axial projections of splines 8a for rotatable coupling of supply reel 4a with a respective reel drive shaft or spindle (not shown) of a tape recording and/or reproducing apparatus. The take-up reel 4b may similarly include a cylindrical hub 5b which, at its upper and lower ends, is loosely and rotatably guided in circular holes 6b in top and bottom walls 1a and 1b, and a lower flange 7b extending radially outward from hub 5b above bottom wall 1b. The inner surface of hub 5b is also shown to be formed with a plurality of circumferentially spaced, axial projections or splines 8b for rotatable coupling of take-up reel 4b with a respective reel drive shaft or spindle (not shown) of a tape recording and/or reproducing apparatus. As shown, reels 4a and 4b are disposed in side-by-side relation with upper flange 7a of reel 4a overlapping or overlying a portion of lower flange 7b of reel 4b. Since the reels 4a and 4b each have only a single flange 7a or 7b for guiding the tape 3 wound thereon, the upper surface of bottom wall 1b of the cassette housing has a raised portion 1'b (FIG. 4) at the region corresponding to supply reel 4a, and such raised portion 1'b is covered with a layer S of low friction material, such as, a sheet of polytetrafluoroethylene or the like, which acts as a low-friction guide for the lower edge of the tape 3 wound on supply reel 4a. Similarly, top wall 1a of the cassette housing has a downwardly thickened portion 1'a at the region thereof corresponding to take-up reel 4b, and the undersurface of such thickened portion 1'a is covered by a layer S of low-friction material for guiding the upper edge of the tape wound on take-up reel 4b (FIG. 4).

Figure 3:
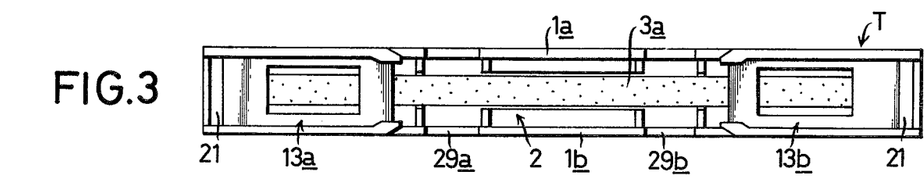
FIG. 3 is a front elevational view of the tape cassette.

The cassette T is shown to be provided with guide rollers 9a and 9b (FIGS. 2 and 5) which are rotatably mounted on pins extending between top and bottom walls 1a and 1b at the corners of housing 1 which are at the opposite ends of opening 2 for guiding tape 3 between reels 4a and 4b in a run 3a (FIGS. 1, 2 and 3) extending along the fourth or open long side of the cassette housing. Further, guide pins 10a and 10b project upwardly from bottom wall 1b adjacent the peripheral wall 1c at the opposite relatively short sides of rectangular housing 1 and engage the tape between reel 4a and guide roller 9a and between reel 4b and guide roller 9b, respectively. Thus, guide pins 10a and 10b direct the tape between reels 4a and 4b and the adjacent ends of run 3a in paths 3b and 3c (FIG. 2) that are adjacent peripheral wall 1c at the opposite relatively short sides of the housing.

In the tape cassette T according to this invention, top and bottom walls 1a and 1b are provided with pairs of aligned, generally U-shaped cutouts 12a and 12b which communicate with opening 2 extending along a long side of the rectangular housing and which are symmetrically disposed adjacent the opposite ends of such long side of the housing. Further, in accordance with this invention, tape cassette T is provided with lid members 13a and 13b which, as hereinafter described in detail, are mounted to pivot relative to housing 1 about respective pivoting axes disposed adjacent the corners of rectangular housing 1 which are at opposite ends of the long open side of the housing. Such pivoting axes are perpendicular to the planes of top and bottom walls 1a and 1b for permitting swinging movements of lid members 13a and 13b in directions parallel to the planes of top and bottom walls 1a and 1b between closed positions (FIGS. 1, 2 and 3), in which lid members 13a and 13b extend along at least part of the open long side of the housing for covering or protecting at least a respective part of the tape in run 3a, and opened positions (FIGS. 10 and 11), in which lid members 13a and 13b are displaced from the opening 2 for permitting the withdrawal of the tape through such opening. Preferably, as shown, lid members 13a and 13b are dimensioned to extend across cutouts 12a and 12b in the top and bottom walls 1a and 1b when the lid members are in their closed positions.

Figures 6, 7, 8, 9:
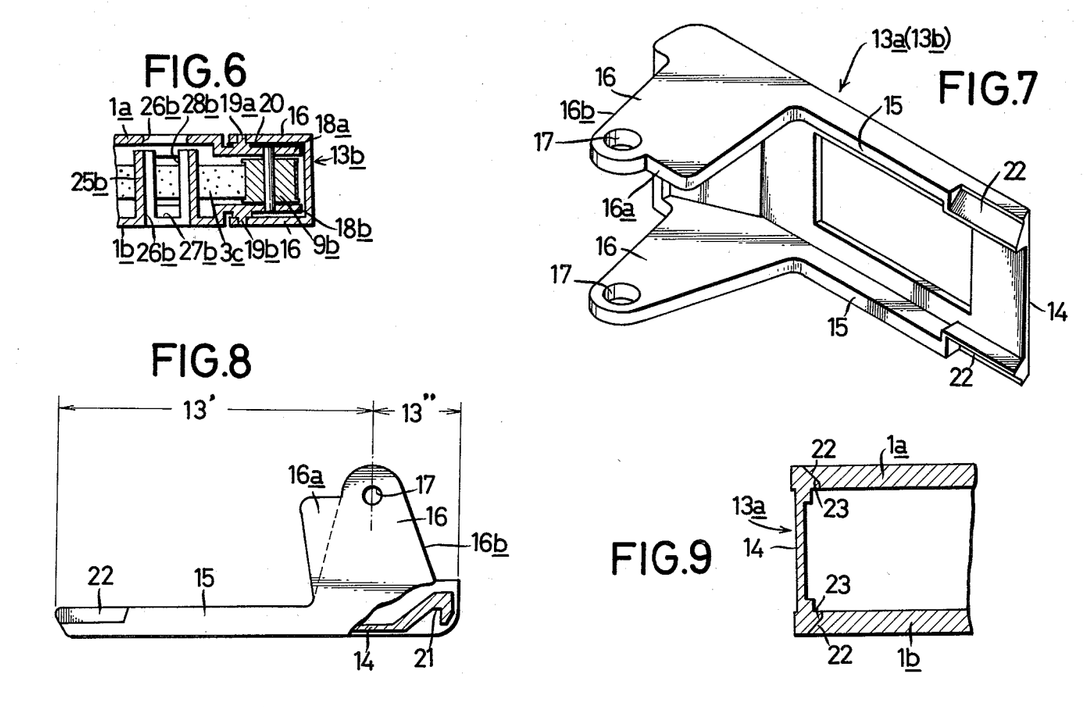
FIG. 6 is a detailed sectional view taken along the line VI—VI on FIG. 2.
FIG. 7 is an enlarged perspective view of one of the lids of the tape cassette according to this invention.
FIG. 8 is a top plan view of the lid shown partly broken away and in section.
FIG. 9 is a detail sectional view taken along the line IX—IX on FIG. 2.

As shown particularly on FIGS. 7 and 8, each of lid members 13a and 13b may be molded of plastic to include a generally flat, elongated body portion 14 dimensioned to form an extension of peripheral wall 1c of the housing and having flanges 15 extending along the top and bottom edges of elongated body portion 14 and being directed toward the cutouts 12a or 12b in the closed position of the respective lid member, with the distance between flanges 15 being greater than the width of tape 3. Ears 16 extend from the upper and lower flanges 15 and are formed with aligned holes 17 which define the pivoting axis of the respective lid member. As shown particularly on FIG. 8, the holes 17 are located so that, in the closed position of the lid member 13a or 13b, a relatively long end portion 13' of the lid member will extend laterally inward with respect to the pivoting axis and a relatively short end portion 13'' will extend laterally outward beyond the respective pivoting axis.

Figure 5:
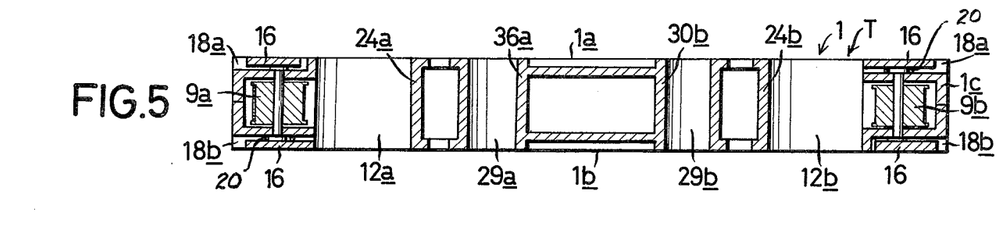
FIG. 5 is a sectional view taken along the line V—V on FIG. 2.

As shown particularly on FIGS. 1, 5 and 6, top and bottom walls 1a and 1b are offset toward each other at the corners of housing 1 wherein lid members 13a and 13b are pivoted to define recesses 18a and 18b into which ears 16 extend with substantial clearance, and aligned pivot pins 19a and 19b project from top and bottom walls 1a and 1b within recesses 18a and 18b, respectively, and are received in holes 17 of the respective lid member 13a or 13b for pivoting the latter on housing 1, as previously mentioned. As shown on FIGS. 7 and 8, at least the upper ear 16 of each of lid members 13a and 13b is formed with a nose portion 16a which is engageable with an edge surface 18' (FIG. 1) of the respective recess 18a for limiting the swinging movement of the lid member in the direction toward its closed position. Further, a torsion spring 20 extends around each of the pivot pins 19a and has its opposite end portions engaging against an edge wall surface 18'' of the respective recess 18a and the outer edge of the upper ear 16 of the respective lid member 13a or 13b for urging the latter to its closed position. It will also be seen that the outer edge 16b (FIGS. 7 and 8) of each ear 16 is engageable against the edge wall surface 18'' of the respective recess 18a or 18b for limiting the swinging movement of the lid member 13a or 13b in the direction toward its open position.

As shown particularly on FIGS. 1, 2 and 8, the laterally outward end portion 13'' of each of lid members 13a and 13b has a notch or recess 21 of substantially saw-tooth cross-section opening at the outer surface of elongated body portion 14 so that such notch or recess 21 may be engaged for displacement of the respective lid member to its opened position, as hereinafter described in detail.

Since there is substantial clearance between the ears 16 of each of lid members 13a and 13b and the surfaces of the respective recesses 18a and 18b, each lid member is movable, to some extent, in the direction of its pivoting axis relative to pivot pins 19a and 19b. In order to prevent such movement of each of the lid members when in its closed position, the inner end portions of flanges 15 at the top and bottom of body portion 14 of each lid member are formed with oppositely angled beveled surfaces 22 (FIGS. 7 and 9) which, in the closed position of the lid member, are engageable with mating beveled surfaces 23 formed at corresponding locations on the edges of top and bottom walls 1a and 1b between which opening 2 of the cassette housing is defined. Thus, the mating beveled surfaces 22 and 23, when engaged with each other in the closed position of lid members 13a and 13b under the influence of torsion springs 20 securely hold the lid members against displacement relative to cassette housing 1 in the directions of the pivoting axes of the lid members.

In order to protect the main supply of tape 3 wound on reels 4a and 4b from dust or other impurities that may enter housing 1 through its opening 2, housing 1 is further provided with a partition 24 (FIG. 2) which extends between top and bottom walls 1a and 1b and is directed along substantially the entire length of the cassette housing between opening 2 and reels 4a and 4b. Arcuate extensions 24a and 24b of partition 24 are preferably directed toward opening 2 along the perimeters of cutouts 12a and 12b in the top and bottom walls. Further, the opposite end portions of partition 24 are spaced from peripheral wall 1c at the adjacent relatively short sides of rectangular housing 1 so that the tape 3 in paths 3b and 3c may pass therebetween. Such opposite end portions of partition 24 are preferably in the form of cylindrical shells 25a and 25b which, at their upper and lower ends, extend around circular openings 26a and 26b, respectively, formed in the top and bottom walls of housing 1 to define sockets for receiving locating pins by which cassette T may be operatively positioned on a magnetic tape recording and/or reproducing apparatus, as hereinafter described. Peripheral wall 1c at the opposite relatively sort sides of housing 1 is formed with apertures 27a and 27b at locations registering laterally with cylindrical shells 25a and 25b, respectively (FIG. 2), and such shells 25a and 25b have windows 28a and 28b facing toward apertures 27a and 27b, respectively, with the tape 3 in paths 3b and 3c extending therebetween.

The U-shaped cutouts 12a and 12b are relatively large and have diametrical dimensions $D_1$ (FIG. 2) larger than the diameters of pinch rollers which are to be inserted therein as hereinafter described in detail. For example, if the pinch rollers to be inserted in cutouts 12a and 12b have a diameter of about 10mm., the diametrical dimensions $D_1$ of cutouts 12a and 12b should be larger than 12mm.

Although the tape cassette T according to this invention may be used in a recording and/or reproducing apparatus in which the pinch rollers and all other tape withdrawing members are insertable only in the cutouts 12a and 12b, as hereinafter described, the top and bottom walls 1a and 1b are further preferably provided with aligned pairs of relatively small U-shaped cutouts 29a and 29b which also communicate with opening 2 of the housing and which are symmetrically disposed at locations spaced inwardly from the large cutouts 12a and 12b, respectively. Arcuate partitions 30a and 30b preferably extend between top and bottom walls 1a and 1b along the margins of the relatively small cutouts 29a and 29b, respectively. The relatively small cutouts 29a and 29b are provided to receive additional tape withdrawing members when tape cassette T is employed on a tape recording and/or reproducing apparatus which has such tape withdrawing members insertable in cutouts 29a and 29b in addition to pinch rollers and/or other tape withdrawing members insertable in the large cutouts 12a and 12b.

Figure 10:
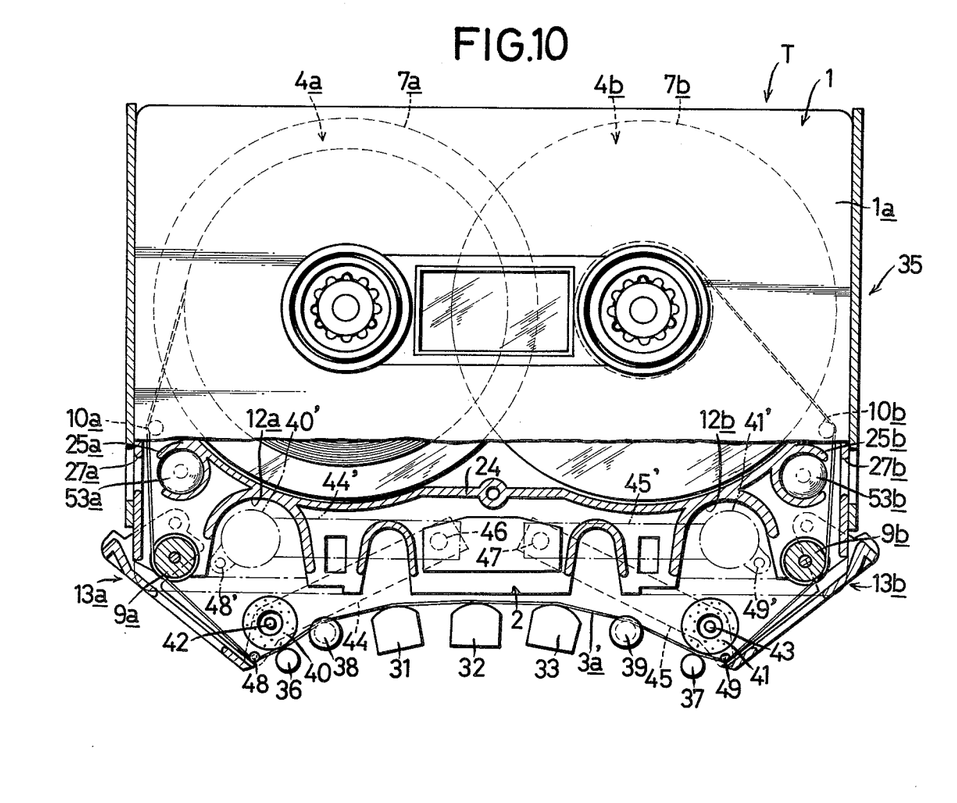
FIG. 10 is a view similar to that of FIG. 2, but showing the tape cassette with its lids opened by means of a tape recording and/or reproducing apparatus which is schematically illustrated to be of a type with which the tape cassette according to this invention may be employed.
Figure 11:
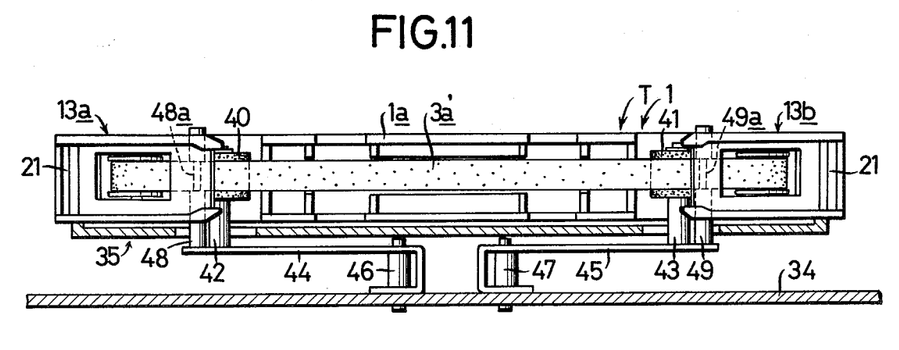
FIG. 11 is a front elevational view of the arrangement shown on FIG. 10.

Referring now to FIGS. 10 and 11, it will be seen that the above described tape cassette T embodying this invention may be used in a tape recording and/or reproducing apparatus having a magnetic erasing head 31, a magnetic recording head 32 and a magnetic recording head 33 (FIG. 10) that are suitably mounted in side-by-side arrangement on a chassis 34 (FIG. 11). A cassette holder indicated schematically at 35 is suitably mounted on chassis 34 for movement between a raised position (not shown) in which the cassette T is insertable in and removable from the holder 35, and a lowered operative position (FIGS. 10 and 11) in which the cassette housing 1 is disposed at the level of magnetic heads 31, 32 and 33 with the opening 2 of the cassette housing facing toward and being spaced from such magnetic heads so that the tape in run 3a has to be withdrawn from the housing through opening 2 for engagement with heads 31, 32 and 33 during recording and reproducing operations of the apparatus. The apparatus appearing on FIG. 10 is further shown to be of the dual-capstan closed-loop type in which suitably rotated capstans 36 and 37 are respectively disposed at the left- and right-hand sides of the group of magnetic heads 31, 32 and 33. A tape guide 38 extends upwardly from chassis 34 between capstan 36 and the adjacent magnetic erasing head 31, and a tape guide 39 similarly extends upwardly from chassis 34 between magnetic reproducing head 33 and capstan 37. The tape guides 38 and 39 preferably have cylindrical guide surfaces with radial flanges at the top and bottom thereof for precisely guiding the tape in the direction of its width during recording and reproducing operations.

The tape recording and/or reproducing apparatus illustrated on FIGS. 10 and 11 is further shown to have pinch rollers 40 and 41 which are adapted to cooperate with capstans 36 and 37, respectively, for driving the tape 3 during recording and reproducing operation.

The pinch rollers 40 and 41 are rotatably mounted on shafts 42 and 43 which project upwardly from pinch roller support arms 44 and 45, respectively. The shafts 42 and 43 are mounted adjacent outer end portions of the respective support arms 44 and 45 which, at their inner ends, are pivotally mounted on laterally spaced apart pivots 46 and 47, respectively, carried by chassis 34 at positions under holder 35. Support arms 44 and 45 are suitably movable between inoperative positions indicated at 44' and 45' on FIG. 10 and in which the support arms extend laterally away from each other in longitudinal alignment so as to dispose the respective pinch rollers, as indicated at 40' and 41', in vertical registration with cutouts 12a and 12b of the operatively positioned cassette housing 1, and forwardly swung operative positions indicated at 44 and 45 on FIG. 10, and in which the respective pinch rollers 40 and 41 are pressed against the capstans 36 and 37 with the tape therebetween.

The free ends of pinch roller support arms 44 and 45 further have tape withdrawing or shifting pins 48 and 49 projecting outwardly therefrom and spaced outwardly in relation to the respective pinch rollers 40 and 41. In the inoperative positions of the support arms indicated at 44' and 45', the tape shifting or withdrawing pins 48 and 49 are also disposed in vertical registry with the cutouts 12a and 12b of an operatively positioned cassette housing 1. The tape shifting or withdrawing pins 48 and 49 preferably have annular grooves 48a and 49a (FIG. 11) at their mid portions with such grooves 48a and 49a each having an axial dimension substantially equal to the width of the tape 3 so that the latter may be received in grooves 48a and 49a so as to be guided by the latter in the direction of the tape width.

When installing a tape cassette T in the described apparatus, the cassette is inserted in holder 35 with the latter in its raised position at which holder 35 is at a level substantially above pinch rollers 40 and 41 and tape shifting pins 48 and 49. Then, with the pinch roller support arms at their inoperative positions indicated at 44' and 45', respectively, holder 35 is moved downwardly to its operative position for similarly displacing the cassette T received in holder 1. During such downward displacement of the tape cassette, the inoperatively positioned pinch roller and tape shifting pin indicated at 40' and 48' and the inoperatively positioned pinch roller and tape shifting pin indicated at 41' and 49' are inserted upwardly into cutouts 12a an 12b, respectively, of cassette housing 1 so as to be disposed in back of the tape run 3a extending along the opening 2 of the cassette housing. Of course, during the insertion of cassette T in holder 35 and during the movement of the latter to its operative position, lids 13a and 13b are in their closed positions, as shown on FIGS. 1 and 2, and extend across cutouts 12a and 12b.

After tape cassette T has been disposed in its operative position, the selection of a recording or reproducing mode of operation of the apparatus is effective through a suitable mechanism (not shown) to swing the pinch roller support arms from their inoperative positions indicated at 44' and 45' to their operative positions indicated at 44 and 45 on FIG. 10. During such swinging movements of support arms 44 and 45 to their operative positions, tape shifting pin 48 and pinch roller 40 and tape shifting pin 49 and pinch roller 41, which act as tape withdrawing means, move out of the respective cutouts 12a and 12b through opening 2 and thus act against tape run 3a for withdrawing such tape run from cassette housing 1 and disposing the withdrawn tape in the operative path indicated at 3'a on FIG. 10. During such movement of tape shifting pins 48 and 49 to their operative positions, the portions of the tape shifting pins above and below their respective grooves 48a and 49a bear against flanges 15 extending along the top and bottom edges of the adjacent lid members 13a and 13b so as to swing the latter to their opened positions against the force of the respective torsion springs 20, as shown on FIG. 10.

It will be noted that, in the operative positions of support arms 44 and 45, pinch rollers 40 and 41 are pressed against the respective capstans 36 and 37 with the tape in path or run 3'a disposed therebetween. Further, the tape in path or run 3'a is engaged with tape guides 38 and 39 and with heads 31, 32 and 33, therebetween, while the tape shifting pins 48 and 49 determine the angles at which the tape is led into the nip between capstan 36 and pinch roller 40 and out of the nip between capstan 37 and pinch roller 41. Accordingly, with the tape 3 withdrawn from cassette housing 1 and disposed in the path or run 3'a, the tape is made to run past heads 31, 32 and 33 at a predetermined speed by means of capstans 36 and 37 and the cooperating pinch rollers 40 and 41, with such tape movement being in the direction from supply reel 4a to take-up reel 4b which is suitably rotated to wind the tape thereon as the tape is driven by the dual capstans and cooperating pinch rollers. During the described movement of the tape, heads 31 and 32 may be made operative to respectively erase signals previously recorded on the tape and to record new information signals on the tape, or head 33 may be made operative to reproduce signals previously recorded on the tape. It will be noted that, during such recording and reproducing operations, the tape extending from guide roller 9a to tape shifting pin 48 and from tape shifting pin 49 to guide roller 9b is maintained out of contact with lid members 13a and 13b by reason of the engagement of the upper and lower end portions of the tape shifting pins 48 and 49 with the flanges 15 of the respective lid members.

When a fast-forward or rewind mode of operation of the apparatus is selected, the pinch roller support arms 44 and 45 are returned to their original or inorperative positions indicated at 44' and 45', respectively, so that the pinch rollers 40 and 41 and the tape shifting pins 48 and 49 are again located in cutouts 12a and 12b and disengaged from the tape which is returned to its original straight run 3a between guide rollers 9a and 9b. Of course, the return of pinch roller support arms 44 and 45 to their inoperative positions and the return of the respective tape shifting pins 48 and 49 to within the cutouts 12a and 12b, respectively, permits the movement of lid members 13a and 13b to their closed positions by the respective torsion springs 20. In such closed positions of lid members 13a and 13b, the tape in run 3a lies between the flanges 15 of each lid member and is spaced from the body portion 14 of the lid member, as shown particularly on FIG. 2.

If the tape cassette T is employed with a tape recording and/or reproducing apparatus of the single-capstan type, for example, an apparatus in which the capstan 36 and associated pinch roller 40 are omitted, then the support arm 44 would carry only the tape shifting or withdrawing pin 48 for opening the lid member 13a and for ensuring that, when the tape is withdrawn from cassette housing 1, the withdrawn tape would follow the path 3'a and thus effect the desired engagement with tape guide 38 for ensuring proper contact with heads 31, 32 and 33.

Figure 12:
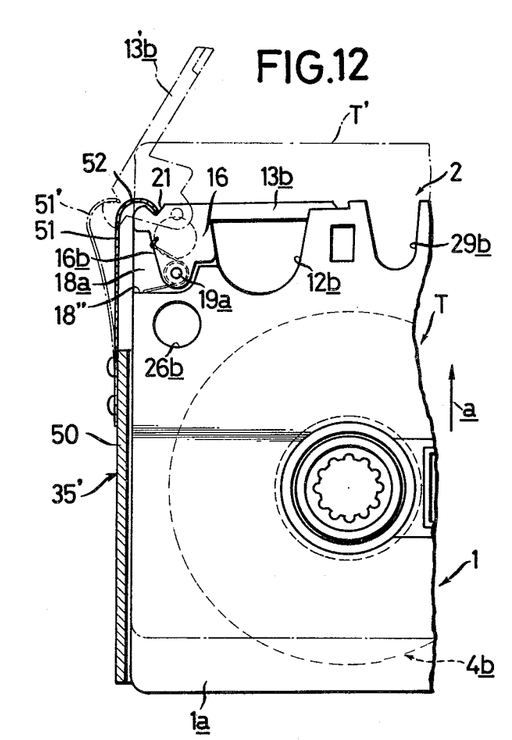
FIG. 12 is a fragmentary top plan view of the tape cassette according to this invention and illustrating schematically how each lid thereof may be opened in another type of recording and/or reproducing apparatus with which such cassette may be employed.

When the tape cassette T is used in the apparatus shown on FIGS. 10 and 11 or in the above described modification thereof, the normally closed lid members 13a and 13b are moved to their opened positions in response to the swinging of support arms 44 and 45 for withdrawing the tape from cassette housing 1 and positioning the withdrawn tape in operative engagement with the capstan or capstans and magnetic heads which are spaced from the operatively positioned cassette. However, as shown on FIG. 12, the tape cassette T according to this invention may also be used in a tape recording and/or reproducing apparatus in which the lids 13a and 13b of the cassette are automatically opened in response to the insertion of the cassette into the holder 35' of such apparatus. In such case, the cassette T is slidably inserted into holder 35' in the direction of the arrow a on FIG. 12 with the long side of cassette housing 1 having the opening 2 therealong being in leading position and with holder 35' in its raised position. In order to effect the opening of lids 13a and 13b in response to such slidable insertion of cassette T into holder 35', the latter has side walls or flanges 50 for laterally guiding cassette housing 1, and leaf springs 51 are suitably secured to the forward end portions of side walls or flanges 50 and are directed forwardly therefrom to terminate in inwardly bent, hooked end portions 52. Each leaf spring 51 is normally positioned as shown in full lines on FIG. 12 so that, when tape cassette T reaches the position shown in full lines during its slidable insertion into holder 35', the hooked end portion 52 of each spring 51 engages in the notch or recess 21 provided in the laterally outer end portion of the adjacent lid member 13a or 13b. Thereafter, during further sliding movement of cassette T in the direction of the arrow a relative to holder 35', for example, to the position indicated in broken lines at T', the engagement of hooked end portion 52 of each spring 51 in notch or recess 21 of the adjacent lid member 13a or 13b causes swinging of the latter toward its opened position, for example, as indicated in broken lines at 13'b on FIG. 12. During the swinging of the lid member to its opened position, the respective spring 51 flexes, for example, to the position indicated in broken lines at 51'. Finally, in the opened position of each lid member, the outer edge surface 16b of its upper ear 16 comes into contact with the edge wall surface 18' of the respective recess 18a so as to prevent further swinging of the lid member beyond its opened position. Thus, the engagement of the hooked end portion 52 of each spring 51 in the recess or notch 21 of the respective lid member 13a or 13b serves to prevent further inserting movement of the tape cassette T relative to holder 35' in the direction of the arrow a when the lid member 13a or 13b has reached its fully opened position. Accordingly, the springs 51 may function both to cause opening of lid members 13a and 13b in response to slidable insertion of the tape cassette T into holder 35' and also to limit the inserting movement of the tape cassette relative to the holder. However, it is preferred that the holder 35' be provided with a stop or abutment apart from springs 51 for limiting the inserting movement of cassette T into holder 35' in order to avoid possible damage to lid members 13a and 13b if the tape cassette is forcibly urged in the direction of insertion after it has attained the position indicated at T' in which the lid members are fully opened.

Figure 13:
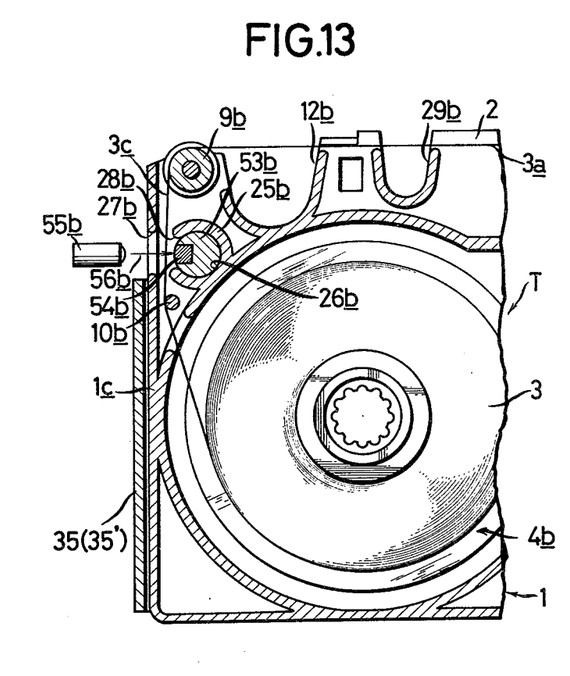
FIG. 13 is a fragmentary top plan view of the tape cassette according to this invention and illustrating the manner in which such cassette is adapted for use in a recording and/or reproducing apparatus having a tape end detecting device.

The apparatus provided with the holder 35' described above with reference to FIG. 12 is, of course, further provided with the pinch rollers 40 and 41 and the tape shifting pins 48 and 49 mounted on the support arms 44 and 45, as previously described with reference to FIGS. 10 and 11. Thus, after the lid members 13a and 13b have been fully opened in response to the insertion of the tape cassette T into holder 35', the latter is moved downwardly to its operative position for upwardly inserting the pinch roller 40 and tape shifting pin 48 and the pinch roller 41 and tape shifting pin 49 into cutouts 12a and 12b of cassette housing 1, whereupon, upon the selection of a recording or reproducing mode of operation, the support arms 44 and 45 are displaced to their operative positions to cause pinch rollers 40 and 41 and tape shifting pins 48 and 49 to withdraw the tape from the cassette housing and to establish the path 3'a of the withdrawn tape, as previously described. When the cassette holder 35 or 35' is moved downwardly to its operative position, cassette-positioning or locating pins indicated at 53a and 53b on FIG. 10, and which are fixed to the chassis, are inserted upwardly into the sockets of cassette housing 1 defined by the cylindrical shells 25a and 25b and the aligned openings 26a and 26b. On FIG. 13, only the cassette-positioning or locating pin 53b is shown inserted in the socket defined by shell 25b and openings 26b, but it is to be understood that the cassette positioning pin 53a is similarly inserted into the other socket defined by shell 25a and respective openings 26a. As shown on FIG. 13, locating pin 53b has a photo-sensitive element 54b embedded therein so as to face toward window 28b when pin 53b is inserted in the respective socket. Further, a lamp 55b is fixedly positioned to direct a light beam 56b inwardly through the adjacent aperture 27b in peripheral wall 1c of cassette housing 1 when the tape cassette T is in its operative position. The tape 3 which is wound on reels 4a and 4b is, for the most part, comprised of an opaque magnetic tape for the recording and reproducing of audio or other information signals and further includes transparent leaders which extend from the opposite ends of the opaque magnetic tape and are respectively secured to the hubs of reels 4a and 4b. So long as the tape in path 3c is constituted by the opaque magnetic tape, the latter blocks the light beam 56b so that the photo-sensitive element 54b in locating pin 53b is not energized. However, when a transparent leader is disposed in the path 3c, the light beam 56b passes therethrough and through window 28b of shell 25b to energize or irradiate photo-sensitive element 54b and, in response to such energizing of element 54b, a suitable automatic shut-off mechanism (not shown) is actuated to halt the driving of the tape. Thus, the arrangement shown on FIG. 13 is operative to detect the end portions of tape 3, that is, the full winding of the tape on either the supply reel 4a or the take-up reel 4b. Although FIG. 13 shows the locating pin 53b received in the socket defined by shell 25b and openings 26b to be provided with the photo-sensitive element 54b, it will be understood that such photo-sensitive element may be alternatively provided in the other locating pin 53a adapted to be inserted in the socket defined by the shell 25a and openings 26a for energization by a light beam from a light source which is disposed adjacent the aperture 27a when the cassette housing is in its operative position, or that such photo-sensitive elements may be provided in both cassette-positioning or locating pins 53a and 53b for association with respective light sources.

It will be appreciated that, when lid members 13a and 13b are in their closed positions, as shown particularly on FIGS. 1 and 2, such lid members serve to protect at least the portions of the tape in run 3a which extend across cutouts 12a and 12b, while the remainder of the tape in run 3a, that is, the portion thereof between closed lid members 13a and 13b, is shielded by the related edge portions of top and bottom walls 1a and 1b which project beyond run 3a. Further, since lid members 13a and 13b are movable in directions parallel to the planes of top and bottom walls 1a and 1b in moving between their closed and opened positions, such movements of the lid members can be easily effected, for example, in response to withdrawal of the tape from the cassette housing, as described above with reference to FIGS. 10 and 11, or in response to the insertion of the cassette housing into a holder, as described above with reference to FIG. 12. Furthermore, the requirements for opening the lid members 13a and 13b do not impose limitations on the arrangement of the magnetic heads 31, 32 and 33, the capstans 36 and 37 and the guides 38 and 39 at the outside of the cassette housing, with the result that such elements located outside of the cassette housing can be disposed to provide the most desirable conditions for recording and reproducing operations.

Although an illustrative embodiment of a tape cassette according to this invention has been described in detail herein with reference to the accompanying drawings, it is to be understood that the invention is not limited to that precise embodiment, and that various changes and modifications may be effected therein by one skilled in the art without departing from the scope or spirit of the invention, as defined in the appended claims.

What is claimed is:

1. A tape cassette comprising a housing of generally rectangular configuration having substantially parallel top and bottom walls and a peripheral wall extending between said top and bottom walls along three of the sides of the housing so as to define an opening between said top and bottom walls along the fourth side of the housing; reel means rotatably disposed in said housing and having a supply of tape wound thereon; guide means in said housing for guiding said tape in a run extending along said fourth side of the housing; said top and bottom walls having at least a pair of cutouts therein which communicate with said opening and through which tape withdrawing and lid opening means may be inserted in said housing and then moved out of said cutouts through said opening; and a pair of lid members pivotally mounted on said housing adjacent the corners of the latter which are at opposite ends of said fourth side for swinging movement in directions parallel to the planes of said top and bottom walls between a closed position, in which each of said lid members extends along at least part of said fourth side of the housing across a respective one of said cutouts for covering at least a respective part of the tape in said run, and an opened position, in which each said lid member is displaced from said opening in response to the movement of said lid opening means out of said cutouts through said opening of the housing for permitting the withdrawal of the tape therethrough by said tape withdrawing means.

2. A tape cassette according to claim 1; further comprising spring means for yieldably urging said lid members to said closed position.

3. A tape cassette according to claim 1; in which each of said lid members includes opposite end portions extending laterally inward and laterally outward, respectively, relative to the respective pivoting axis in said closed position of the lid member, and said laterally outward extending end portion of each of said lid members has a notch formed therein by which the lid member may be engaged for displacement to said opened position.

4. A tape cassette according to claim 1; in which each of said lid members has a substantially flat, elongated body portion dimensioned to form an extension of said peripheral wall and to extend across said cutouts in said closed position, and flanges extending along the top and bottom edges of said elongated body portion and being directed toward said cutouts in said closed position, with the distance between said flanges being greater than the width of said tape so that the tape withdrawing lid opening means, in moving out of said cutouts through said opening of the housing, can engage said flanges of each of said lid members above the tape for displacing said lid members to said opened position.

5. A tape cassette according to claim 1; in which each of said lid members is loosely mounted on the respective pivoting axis so as to be movable relative to said housing in the direction of said axis, and the edges of each of said lid members and the edges of said top and bottom walls which are adjacent said lid members in said closed position having mating bevels which are mutually engageable in said closed position for holding the lid members against movement relative to the housing in the directions of the respective pivoting axes.

6. A tape cassette according to claim 1; in which said lid members and said housing have surfaces thereon which are cooperatively engageable to limit the swinging movements of said lid members to said opened and closed positions.

7. A tape cassette according to claim 1; in which said reel means includes supply and take-up reels in side-by-side relation within said housing, said housing has sockets opening at least at said bottom wall and being disposed adjacent said peripheral wall at the opposed sides of the housing which are at right angles to said fourth side, at least one of said opposed sides of the housing has an aperture in said peripheral wall in registry with the adjacent one of said sockets, and said guide means directs the tape between said reels and said tape run along paths that extend between said sockets and the peripheral wall at said opposed sides, respectively, of the housing; and in which said tape has a transparent end portion at least at one of said ends so that, when a beam of light is directed inwardly through said aperture toward the adjacent socket and the latter receives a locating member having a photo-sensitive element as a part thereof, such photosensitive element is energized by the light beam only when said transparent end portion of the tape is in the one of said paths extending between the side of the housing having said aperture and said adjacent socket.

8. A tape cassette according to claim 7; in which each of said sockets is defined by a cylindrical shell extending between said top and bottom walls, and at least the shell defining said socket adjacent said aperture has a window facing the latter for the passage therethrough of the light beam directed inwardly through said aperture.

9. A tape recording and/or reproducing apparatus for use with a tape cassette including a tape which is wound on reels rotatable in a cassette housing having top and bottom walls with an opening therebetween along one side of the housing along which a run of the tape between the reels is normally guided and with registered cutouts in the top and bottom walls communicating with the side opening, and lid means mounted on the housing for movement in directions parallel to the planes of the top and bottom walls between a closed position where the lid means extend along the side opening for covering at least respective parts of said run of the tape and an opened position where the lid means are displaced from the side opening for permitting the withdrawal of the tape therethrough: said apparatus comprising a holder for receiving and operatively positioning the cassette housing, magnetic head means disposed so as to be spaced from the open side of the operatively positioned cassette housing, and tape withdrawing and lid opening means insertable in the operatively positioned cassette housing through said cutouts and being movable out of the latter through said open side of the cassette housing for withdrawing the tape from the cassette housing and into engagement with said head means and for displacing said lid means to said opened position from said closed position.

10. A tape recording and/or reproducing apparatus according to claim 9; further comprising rotated capstans disposed at opposite sides of said head means, and pressure rollers mounted on said tape withdrawing means and urging the withdrawn tape against said capstans for driving of the tape by the latter past said head means when the withdrawn tape is in engagement with said head means.

11. A tape recording and/or reproducing apparatus according to claim 9; in which the lid means of the cassette includes a pair of lid members mounted to pivot relative to the cassette housing about respective pivoting axes disposed adjacent the corners of the housing which are at the opposite ends of the open side thereof for swinging movement of said lid members between said closed and opened positions; and in which said tape withdrawing and lid opening means includes a pair of support arms each having a tape shifting pin projecting from one end and being pivotally mounted at its other end for movement between an inoperative position in which the respective tape shifting pin projects through respective cutouts of the cassette housing and an operative position in which said tape shifting pin displaces the tape out of the cassette housing through the open side of the latter and simultaneously acts against a respective one of said lid members for moving the latter to said opened position.

12. A tape recording and/or reproducing apparatus according to claim 11; in which said tape shifting pin on each support arm has a reduced diameter central portion of sufficient axial extent to accommodate the tape therein, while the remaining, relatively larger diameter end portions of the tape shifting pin are engageable with the respective lid member of the cassette.

13. A tape recording and/or reproducing apparatus according to claim 11; further comprising rotated capstans disposed at opposite sides of said head means, and a pressure roller mounted on each one of said support arms adjacent the respective tape shifting pin for also projecting through the respective cutouts of the cassette housing in said inoperative position of the respective support arm and for urging the withdrawn tape against a respective one of said capstans when said respective support arm is moved to its operative position.

14. The combination of a tape cassette comprising a housing of generally rectangular configuration having substantially parallel top and bottom walls and a peripheral wall extending between said top and bottom walls along three of the sides of the housing so as to define an opening between said top and bottom walls along the fourth side of the housing, reel means rotatably disposed in said housing and having a supply of tape wound thereon, guide means in said housing for guiding said tape in a run extending along said fourth side of the housing, said top and bottom walls having at least a pair of cutouts therein which communicate with said opening, and lid means mounted on said housing for movement in directions parallel to the planes of said top and bottom walls between a closed position, in which said lid means extends along at least part of said fourth side of the housing for covering at least a respective part of the tape in said run, and an opened position, in which said lid means is displaced from said opening for permitting the withdrawal of the tape therethrough; and an apparatus for recording and/or reproducing signals on the tape of said cassette comprising a holder for receiving and operatively positioning said housing, magnetic head means disposed in respect to said holder so as to be spaced from the open side of said cassette housing operatively positioned by said holder, and tape withdrawing and lid opening means insertable in said operatively positioned cassette housing through said cutouts and being movable out of the latter through said open side of the cassette housing for withdrawing said tape from the cassette housing through said open side into engagement with said head means and for displacing said lid means to said opened position from said closed position.

15. The combination according to claim 14; in which said apparatus further comprises rotated capstans disposed at opposite sides of said head means, and pressure rollers mounted on said tape withdrawing means and urging the withdrawn tape against said capstans for driving of the tape by the latter past said head means when the withdrawn tape is in engagement with said head means.

16. The combination according to claim 14; in which said lid means of the cassette includes a pair of lid members mounted to pivot relative to the cassette housing about respective pivoting axes disposed adjacent the corners of the housing which are at the opposite ends of the open side thereof for swinging movement of said lid members between said closed and opened positions; and in which said tape withdrawing and lid opening means includes a pair of support arms each having a tape shifting pin projecting from one end and being pivotally mounted at its other end for movement between an inoperative position in which the respective tape shifting pin projects through respective cutouts of the cassette housing and an operative position in which said tape shifting pin displaces the tape out of the cassette housing through the open side of the latter and simultaneously acts against a respective one of said lid members for moving the latter to said opened position.

17. The combination according to claim 16; in which said tape shifting pin on each support arm has a reduced diameter central portion of sufficient axial extent to accommodate the tape therein, while the remaining, relatively larger diameter end portions of the tape shifting pin are engageable with the respective lid member of the cassette.

18. The combination according to claim 16; in which said apparatus further comprises rotated capstans disposed at opposite sides of said head means, and a pressure roller mounted on each one of said support arms adjacent the respective tape shifting pin for also projecting through the respective cutouts of the cassette housing in said inoperative position of the respective support arm and for urging the withdrawn tape against a respective one of said capstans when said respective support arm is moved to its operative position.

19. A tape cassette according to claim 1; in which said tape withdrawing and lid opening means are integrally formed so as to be movable as a unit out of said cutouts through said opening.

* * * * *